US006959011B2

(12) United States Patent
Takizawa et al.

(10) Patent No.: US 6,959,011 B2

(45) Date of Patent: Oct. 25, 2005

(54) DATA TRANSMISSION AND RECEPTION SYSTEM, DATA TRANSMITTER AND DATA RECEIVER

(75) Inventors: Koichi Takizawa, Tokyo (JP); Kazuo Kubo, Tokyo (JP); Hiroshi Ichibangase, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 764 days.

(21) Appl. No.: 09/734,618

(22) Filed: Dec. 13, 2000

(65) Prior Publication Data

US 2001/0021203 A1 Sep. 13, 2001

(30) Foreign Application Priority Data

Dec. 14, 1999 (JP) ................................ 11-355070

(51) Int. Cl.[7] ................................................ H04J 3/06

(52) U.S. Cl. ...................... 370/509; 370/535; 370/536; 370/537; 375/354

(58) Field of Search ................................ 370/503, 504, 370/505, 506, 509, 510, 512, 514, 535, 536, 370/537, 538, 539, 540; 375/354, 365, 368, 375/369

(56) References Cited

U.S. PATENT DOCUMENTS 4,071,703 A * 1/1978 Schaffter .................... 370/370
4,667,324 A * 5/1987 Graves ....................... 370/538
6,011,807 A * 1/2000 Castagna et al. ........... 370/506
2001/0021203 A1 * 9/2001 Takizawa et al. ........... 370/539

FOREIGN PATENT DOCUMENTS

EP 0397142 A1 11/1990 ............. H04J 3/06
JP 5-175953 7/1993 ............. H04L 7/08

OTHER PUBLICATIONS

Uematsu, Hoshihiko et al., "A Universal Structure for SDH Multiplex Line Terminals with a Unique CMOS LSI for SOH Processing," IEICE Transactions on Communications, Institute of Electronics Information and Comm. Eng. Tokyo, JP, Mar. 01, 1995, pp. 362-372.

* cited by examiner

*Primary Examiner*—Dang Ton
*Assistant Examiner*—Shick Hom
(74) *Attorney, Agent, or Firm*—Birch, Stewart, Kolasch & Birch, LLP

(57) ABSTRACT

The data transmission and reception system comprises a data transmitter and a data receiver. The data transmitter generates and transmits a high-speed serial signal through a transmission path and the data receiver receives the serial signal. The data transmitter, when forming the frame for every tributary signal, inserts into the frame a frame bit indicating a boundary of the frame and, after having formed the frame, performs only a bit synchronization with respect to every tributary signal. On the other hand, the data receiver, for a respective tributary signal, stores a data indicated by the tributary signal and, in a timing based on a detection of the frame bit of the tributary signal and a reference frame pulse commonly issued between tributary signals, outputs the stored data to thereby perform the tributary synchronization.

14 Claims, 9 Drawing Sheets

DATA TRANSMISSION AND RECEPTION SYSTEM, DATA TRANSMITTER AND DATA RECEIVER

FIELD OF THE INVENTION

The present invention in general relates to a data transmission and reception system, a data transmitter and a data receiver. More specifically, this invention relates to a technology of synchronizing a timing between tributary signals so that data to be transmitted match before and after the transmission in a data communication system in which data to be transmitted are multi-divided to perform an coding or decoding process.

BACKGROUND OF THE INVENTION

With the spread of international digital communication networks, the CCITT (International Telegraph and Telephone Consultative Committee) has recommended a SDH (Synchronous Digital Hierarchy) as a rule for hierarchical channel multiplexing in a signal multiplex for digital communications, aiming at a mutual connection of digital communications.

The SDH multiplexes a module, called STM (Synchronous Transfer Module), to perform a digital communication. The CCITT made recommendations on various levels of STM, such as a STM-1 (Synchronous Transfer Module level 1, bit rate 155.52 Mb/s), STM-4 (Synchronous Transfer Module level 4, bit rate 622.08 Mb/s), and STM-16 (Synchronous Transfer Module level 16, bit rate 2.4883 Gb/s).

In particular, the SDH constitutes a multiplex communication system to be based on for introduction of an ATM (asynchronous transfer mode) which is one of important techniques in construction of recent wide-band communication networks.

As a conventional synchronous multiplex converter coping with such a communication system, for example, there is disclosed a "synchronism detection circuit" (or synchronoscope) in Japanese Patent Application Laid-Open Publication No. 5-175953. FIG. 8 shows, in block diagram, a schematic arrangement of the conventional synchronism detection circuit, as a circuit adapted for synchronous detection to be performed in particular of a multiplexed signal at the above-noted STM-4.

This conventional synchronism detection circuit is constituted with a bit serial-parallel conversion circuit 701 that converts a serial STM-4 multiplexed signal 705 into an 8-bit parallel STM-4 multiplexed signal, a byte serial-parallel conversion circuit 702 that converts the multiplexed signal 706 into four 8-bit parallel STM-1 signals 707*a*, 707*b*, 707*c*, and 707*d*, first to fourth frame pattern detection circuits 731, 732, 733, and 734 that detect respective frame patterns of the tributary STM-1 signals 707*a*, 707*b*, 707*c*, and 707*d* to output bit shift signals 701*a*, 702*a*, 703*a*, and 704*a* and frame pattern detection signals 701*b*, 702*b*, 703*b*, and 704*b*, a bit shift control circuit 708 responsible for the bit shift signals 701*a*, 702*a*, 703*a*, and 704*a* input from the respective frame pattern detection circuits 731, 732, 733, and 734 to output a bit shift command 709*a* to the bit serial-parallel conversion circuit 701, a synchronism control circuit 704 responsible for the frame pattern detection signals 701*b*, 702*b*, 703*b*, and 704*b* input from the respective frame pattern detection circuits 731, 732, 733, and 734 to output a tributary shift command 704*j* to the byte serial-parallel conversion circuit 702, and a logical product circuit 709 to which outputs of the bit shift control circuit 708 and the synchronism control circuit 704 are input.

How this synchronism detection circuit functions will now be explained. First, the frame pattern detection circuits 731 to 734 are operated, for each of STM-1 signals 707*a* to 707*d* after a multi-division by the byte serial-parallel conversion circuit 702, that is, for each tributary, to detect a bit shift of that STM-1 signal, to thereby output bit shift signals 701*a* to 704*a* to the bit shift control circuit 708.

The bit shift control circuit 708 decides if values of the bit shift signals 701*a* to 704*a* match each other, and responds to any match at a value other than 0, by giving a bit advance decision signal 708*b* to be sent to the synchronism control circuit 704 and a concurrent pulse 708*a*, corresponding to its value, to be sent to the logical product circuit 709.

On the other hand, at the synchronism control circuit 704, there are input frame pattern detection signals 701*b* to 704*b* that are output from the respective frame pattern detection circuits 731 to 734. The synchronism control circuit 704 performs, on basis of the frame pattern detection signals 701*b* to 704*b*, a checking judgment for a slip of their tributary synchronization to thereby output a tributary shift command 704*j*, as a pulse corresponding to the slip, to the byte serial-parallel conversion circuit 702.

Further, the synchronism control circuit 704 is responsible for combination of the frame pattern detection signals 701*b* to 704*b* and the bit advance decision signal 708*b* output from the bit shift control circuit 708, to detect a slipped state of synchronism to thereby send a synchronism slip signal 704*k* to the logical product circuit 709. Therefore, the logical product circuit 709 inputs thereto the pulse 708*a* indicating a bit advance value and the synchronism slip signal 704*k*, and outputs a result of operation of a logical product between them to the bit serial-parallel conversion circuit 701, which means that the bit serial-parallel conversion circuit 701 has, in a synchronism slipping state, a bit shift command 709*a* input thereto.

Accordingly, the bit serial-parallel conversion circuit 701 and the byte serial-parallel conversion circuit 702 input thereto the bit shift command 709*a* and the tributary shift command 704*j*, respectively, and respond thereto by synchronism pull-in actions to establish a tributary synchronization.

The conventional synchronism detection circuit, however, detects a tributary slip amount based on the timing of occurrences of the frame pattern detection signals 701*b* to 704*b*, and inputs a pulse corresponding to the amount as the tributary shift command 704*j* to the byte serial-parallel conversion circuit 702, to thereby achieve a correction of tributary slip, and as a premise, it is necessary for respective tributary frame bits to be matching upon reception of the serial STM-4 multiplexed signal 705.

FIG. 9 describes, by illustration, positions of frame bits contained in data associated with actions of the conventional synchronism detection circuit. As shown in FIG. 9, at the end of a transmitter cooperating with a receiver, which has the above-noted synchronism detection circuit installed therein, to constitute a data transmission and reception system, tributary signals 801*a*, 801*b*, 801*c*, and 801*d* have frame bits 802 simultaneously inserted therein. Therefore, in a signal 803 multiplexed by a parallel-serial conversion, frame bits of the tributary signals are disposed in specified positions.

Then, upon a serial-parallel conversion at the receiver end, the frame bits of tributary signals have their slipped positions in dependence on their timing of the conversion. The synchronism detection circuit described detects bit slips of the tributary signals to thereby make a decision for tributary signals to be inherently distributed, information whereof is based on for timing adjustment of the serial-parallel conversion circuit to achieve a tributary synchronization.

It is therefore necessary for implementation of a tributary synchronization at the conventional synchronism detection circuit to output tributary signals with frame bits matching in phase at the transmitter end.

However, with an increased speed in terms of bit rate in communication, it has become impossible to neglect a phase skew of parallel signals due to a phase dispersion of devices, as well as dispersions in production or application. In a probable case such that with a still increased communication speed the phase dispersion of frames between tributary signals has a phase difference of 1 bit or more, it will become difficult as a problem for a parallel-serial conversion to be performed, at a parallel-serial conversion circuit in the transmitter, with frames of tributary signals matching in phase.

Further, in the data transmission and reception system in which the above-noted synchronism detection circuit is introduced in the receiver, if a multiplexed signal with frames slipped in phase between tributary signals is subjected as it is to the parallel-serial conversion for transmission at the transmitter end, then the receiver will fail to make a proper tributary synchronization, so that the original signal cannot be reproduced.

SUMMARY OF THE INVENTION

It is an object of the invention to provide a data transmission and reception system, a data transmitter and a data receiver that can achieve a high-speed tributary synchronization without needing a match in frame phase between tributary signals at a data transmission end.

The data transmission and reception system according to one aspect of the invention comprises a data transmitter in which a transmission signal is multi-divided into a plurality of low-speed tributary signals, having a frame formed for a respective tributary signal, and thereafter is multiplexed into a high-speed serial signal to be sent to a transmission path. Further, a data receiver is provided in which a signal received from the transmission path is multi-divided into a plurality of low-speed tributary signals, having a tributary synchronization made to a respective tributary signal, and thereafter is multiplexed into a high-speed serial signal to reproduce the transmission signal. The data transmitter is adapted, when forming the frame, to insert into the frame a frame bit indicating a boundary of the frame and, after having formed the frame, simply to perform a bit synchronization between tributary signals. Further, the data receiver is adapted, for a respective tributary signal, to store a data indicated by the tributary signal and, in a timing based on a detection of the frame bit of the tributary signal and a reference frame pulse commonly issued between tributary signals, to output the stored data to thereby perform the tributary synchronization.

According to the above invention, a data transmitter is adapted to transmit on a transmission path a signal which is simply bit-synchronized for synchronization between tributary signals with frames formed therefor, and a data receiver receiving that signal is adapted, for a respective one of tributary signals into which the signal is multi-divided, for storing a data indicated by the tributary signal to output the data in a timing based on a detection of a frame bit of the tributary signal and a reference frame pulse, to thereby implement a tributary synchronization, so that frames can have a matching phase at the reception end, without the need of a frame synchronization at the transmission end.

The data receiver according to another aspect of the invention is cooperative with a data transmitter, where a transmission signal is multi-divided into a plurality of low-speed tributary signals, having a frame formed for a respective tributary signal, and thereafter is multiplexed into a high-speed serial signal to be sent to a transmission path, to constitute a data transmission and reception system. The high-speed serial signal is multi-divided into a plurality of low-speed tributary signals, having a tributary synchronization made to a respective tributary signal, and thereafter is multiplexed into a high-speed serial signal to reproduce the transmission signal, the data receiver is adapted, for a respective tributary signal, for storing a data indicated by the tributary signal and detecting, from the tributary signal, a frame bit indicating a boundary of the frame, to output the stored data in a timing based on the detected frame bit and a reference frame pulse commonly issued between tributary signals, to thereby perform the tributary synchronization.

According to the above invention, a data receiver receiving a signal from a transmission path is adapted, for a respective one of tributary signals into which the signal is multi-divided, for storing a data indicated by the tributary signal to output the data in a timing based on a detection of a frame bit of the tributary signal and a reference frame pulse, to thereby implement a tributary synchronization, so that frames can have a matching phase at the reception end, without the need of a frame synchronization at the transmission end.

The data transmitter according to still another aspect of the invention multi-divides a transmission signal into a plurality of low-speed tributary signals, having a frame formed for a respective tributary signal, and thereafter is multiplexed into a high-speed serial signal to be sent to a transmission path. This data transmitter comprises a serial-parallel conversion circuit for multi-dividing the transmission signal into a plurality of tributary signals, a coding circuit adapted, for a respective tributary signal, to form a frame containing the frame bit and tributary ID information for identifying the tributary signal, a bit synchronization circuit adapted, for a respective tributary signal for which the frame is formed by the coding circuit, for detecting a phase slip of the tributary signal relative to a common clock signal between tributary signals and delaying the tributary signal in accordance with the detected phase slip to thereby perform a bit synchronization, and a parallel-serial conversion circuit for multiplexing tributary signals, of which a respective one is processed for the bit synchronization by the delay circuit, into a high-speed serial signal to be sent to the transmission path.

According to the above invention, the data transmitter is allowed to employ a bit synchronization circuit adapted, as a circuit for performing a bit synchronization, to detect a phase slip relative to a common clock between tributary signals, and have a respective tributary signal delayed in accordance with the detected phase slip.

Other objects and features of this invention will become apparent from the following description with reference to the accompanying drawings.

DESCRIPTION OF THE PREFERRED EMBODIMENTS

Preferred embodiments of a data transmission and reception system, a data transmitter, and a data receiver according to the present invention will be explained below in detail with reference to the accompanying drawings. In the figure, sections having same or similar structure or function are denoted by same legends and, to avoid repetition of explanation, there explanation will be omitted.

A first embodiment of a data transmission and reception system with a data receiver and a data transmitter according the invention will now be explained. This data transmission and reception system has a peculiarity as follows. That is, at the data transmitter, a frame bit is inserted for a respective one of a plurality of tributary signals, only a bit synchronization between tributary signals performed, without matching the phases of frame bits, and the data is then multiplexed and transmitted. On the other hand, at the data receiver, the multiplexed data is divided for a respective tributary signal and to take out a respective tributary signal in a timing for generation of a common frame pulse and by detection of a frame bit, to thereby effect a tributary synchronization.

Figure 1:
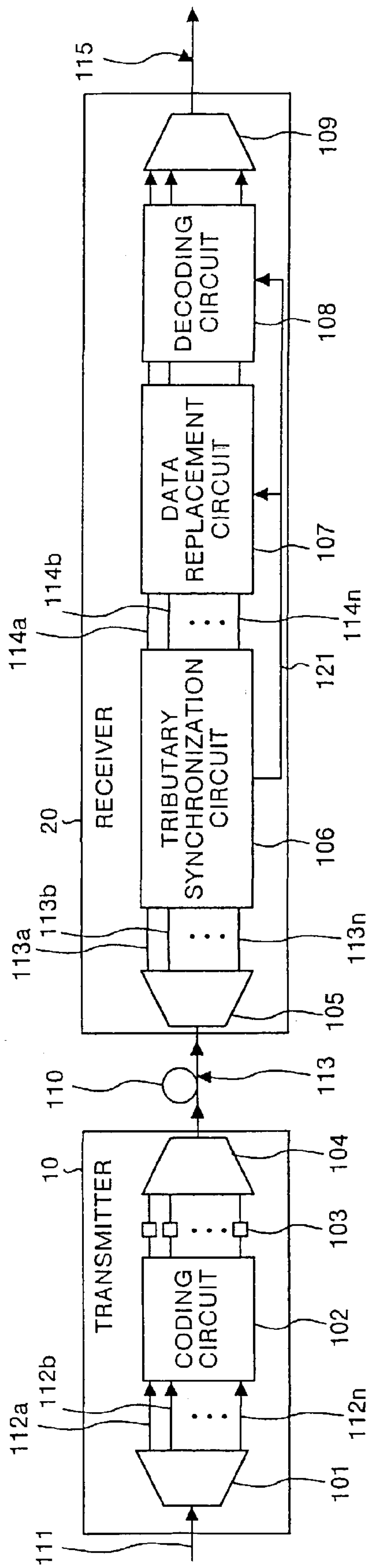
FIG. 1 is a block diagram showing a schematic arrangement of a data transmission and reception system according to a first embodiment of the invention.

FIG. 1 is a block diagram showing a schematic arrangement of a data transmission and reception system according to the first embodiment. The data transmission and reception system shown in FIG. 1 is made up by a data transmitter 10 whereby a high-speed signal made by multiplexing a plurality of tributary signals is transmitted to a transmission path 110, and a data receiver 20 whereby the high-speed signal is received for reproduction of original data.

The data transmitter 10 is constituted with a serial-parallel conversion circuit 101 for distributing a signal 111 to a plurality of tributary signals 112*a*, 112*b*, . . . , 112*n*. A coding circuit 102 is provided, which is adapted, for a respective tributary signal, to form a frame containing a frame bit and tributary ID information. Further, delay circuits 103 are provided, each of which is adapted for a match in phase of bits of a respective tributary signal of which the frame is formed by the coding circuit 102. Finally, a parallel-serial conversion circuit 104 converts the tributary signals, of which bits are matched in phase by the delay circuit 103, into a high-speed serial signal 113.

The data receiver 20 is constituted with a serial-parallel conversion circuit 105 which distributes the high-speed serial signal 113 to respective tributary signals 114*a*, 114*b*, . . . , 114*n*. A tributary synchronization circuit 106 is provided, which is adapted for a match in phase of signal frames between the tributary signals 114*a* to 114*n* distributed by the serial-parallel conversion circuit 105. Further, a data replacement circuit 107 is provided that performs replacement of data between the tributary signals 114*a* to 114*n* of which frames are matched in phase by the tributary synchronization circuit 106. A decoding circuit 108 is provided, which decodes data of each of the tributary signals 114*a* to 114*n* output from the data replacement circuit 107. Finally, a parallel-serial conversion circuit 109 performs parallel-serial conversion of the tributary signals 114*a* to 114*n* decoded by the decoding circuit 108, to reproduce an original data signal 115.

Figure 2:
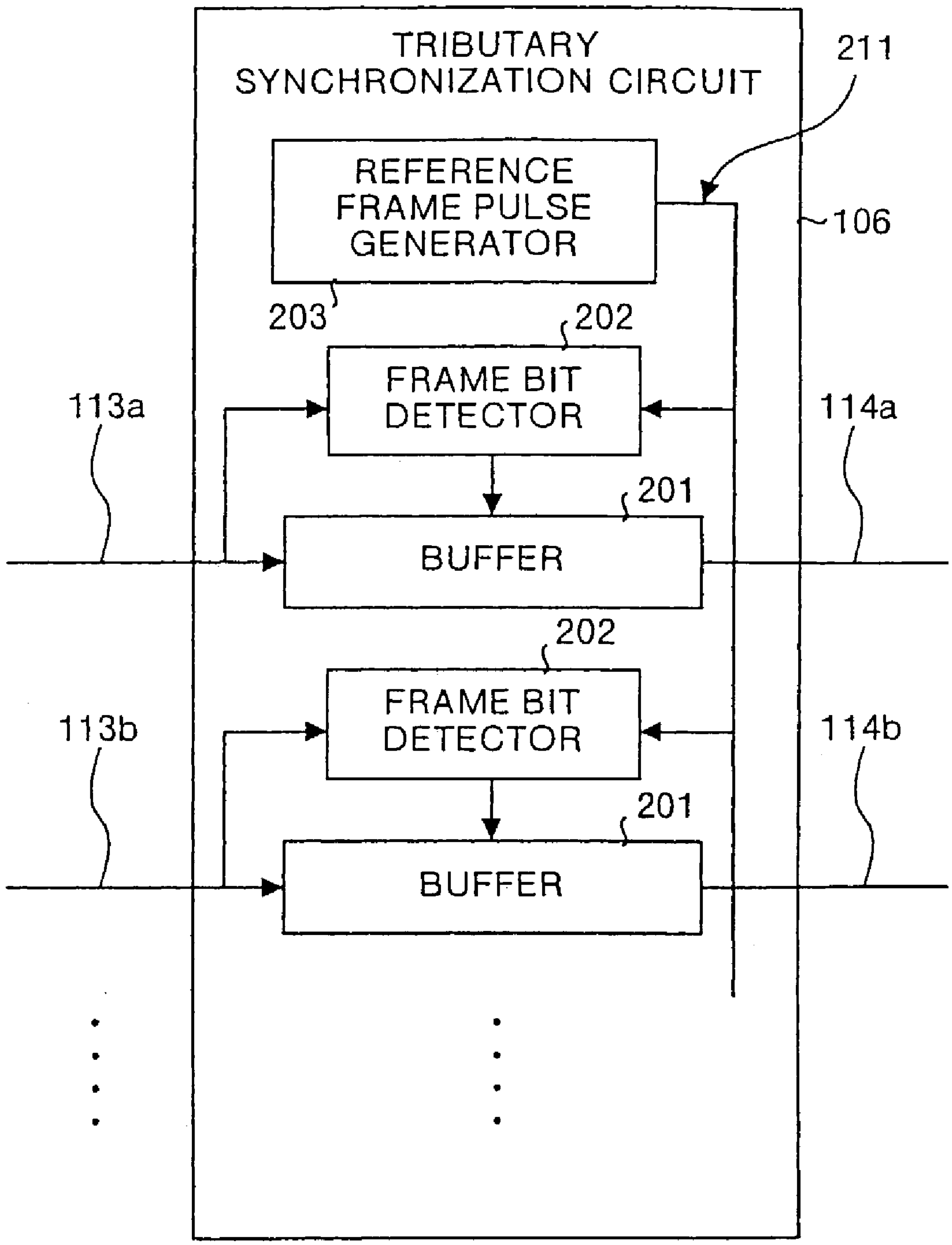
FIG. 2 is a block diagram showing a schematic arrangement of a tributary synchronization circuit of the data transmission and reception system according to the first embodiment.

FIG. 2 is a block diagram showing a schematic arrangement of the tributary synchronization circuit 106. This tributary synchronization circuit 106 is constituted with frame bit detectors 202 that detects a position of a frame bit inserted in each of the tributary signals 113*a* to 113*n*, buffers 201 that stores the tributary signals, and a reference frame pulse generator 203 that generates a reference frame pulse 211 to be a timing for outputting tributary signals stored in the buffers 201.

How the data transmission and reception system constituted with the data transmitter 10 and the data receiver 20 functions will be explained now. First, a signal 111 as a target of data transmission is input to the serial-parallel conversion circuit 101 of the data transmitter 10, where it is converted into parallel signals of a lower speed, to be output as a plurality of tributary signals 112*a* to 112*n*.

At the coding circuit 102, the tributary signals are each based on to form therefrom a frame of a specified number of bytes, with an overhead containing a frame bit and tributary ID information.

The tributary signals, framed by the coding circuit 102, are each respectively input to a delay circuit 103. The delay circuit 103 is a circuit for matching phases of bits of parallel signals to be input to the parallel-serial conversion circuit 104 in the next stage, or in other words, it is a circuit for synchronization of bit clocks. That is, the data to be indicated by each tributary signal is allowed, by the delay circuit 103, to be easy of comparison or adjustment in a bit unit that has a predetermined pulse width.

Then, the tributary signals matched in bit phase by the delay circuits 103 are parallel-to-serial converted by the parallel-serial conversion circuit 104, to be sent as a high-speed signal 113 to the transmission path 110. That is, at the data transmitter 10, there is simply made a bit phase synchronization, without accompanying a frame phase synchronization based on frame bits, unlike the conventional transmitter described.

On the other hand, at the data receiver 20, a high-speed signal 113 received from the transmission path 110 is input to the serial-parallel conversion circuit 105. At the serial-parallel conversion circuit 105, the high-speed signal 113 is parallel converted into tributary signals 114*a* to 114*n*, to be thereby multi-divided. Then, the tributary signals parallel converted by the serial-parallel conversion circuit 105 are input to the tributary synchronization circuit 106.

At the tributary synchronization circuit 106, as shown in FIG. 2, data indicated by the tributary signals are written in the buffers 201, as necessary, and the tributary signals are individually input to the frame bit detectors 202. At each frame bit detector 202, a frame bit position is detected from the input tributary signal, and a signal representing a timing based on a result of the detection and a reference frame pulse 211 output from the reference pulse generator 203 is input to an associated buffer 201.

The reference frame pulse 211 generated by the reference frame pulse generator 203 is a signal representing a timing for written data in the buffers 201 to be concurrently output from the tributary synchronization circuit 106. Although timings of frame bits detected at the frame bit detectors 202 are usually different therebetween, because the data representing the tributary signals are stored in the buffers 201, the timing for the data to be output from the buffers 201 can be adjusted to thereby output the tributary signals with a match in phase of the frame bits.

The reference frame pulse 211 constitutes a reference to determine the output timing. Therefore, data in buffer 201 can be taken out in such a timing that the frame bit of data in the buffer 201 is located at a bit pulse position past for a predetermined number from the timing by which the reference frame pulse 211 has occurred, thereby effecting a frame phase synchronization of tributary signals, that is, the tributary synchronization.

The signal representing a frame bit position detected by the frame bit detector 202 is input also to the data replacement circuit 107 and the decoding circuit 108.

Each tributary signal for which a frame phase synchronism is established by the tributary synchronization circuit 106 is input to the data replacement circuit 107. At the data replacement circuit 107, tributary ID information is detected from each tributary signal, and respective tributary signals are replaced in order in dependence on the detected tributary ID information.

Figure 3:
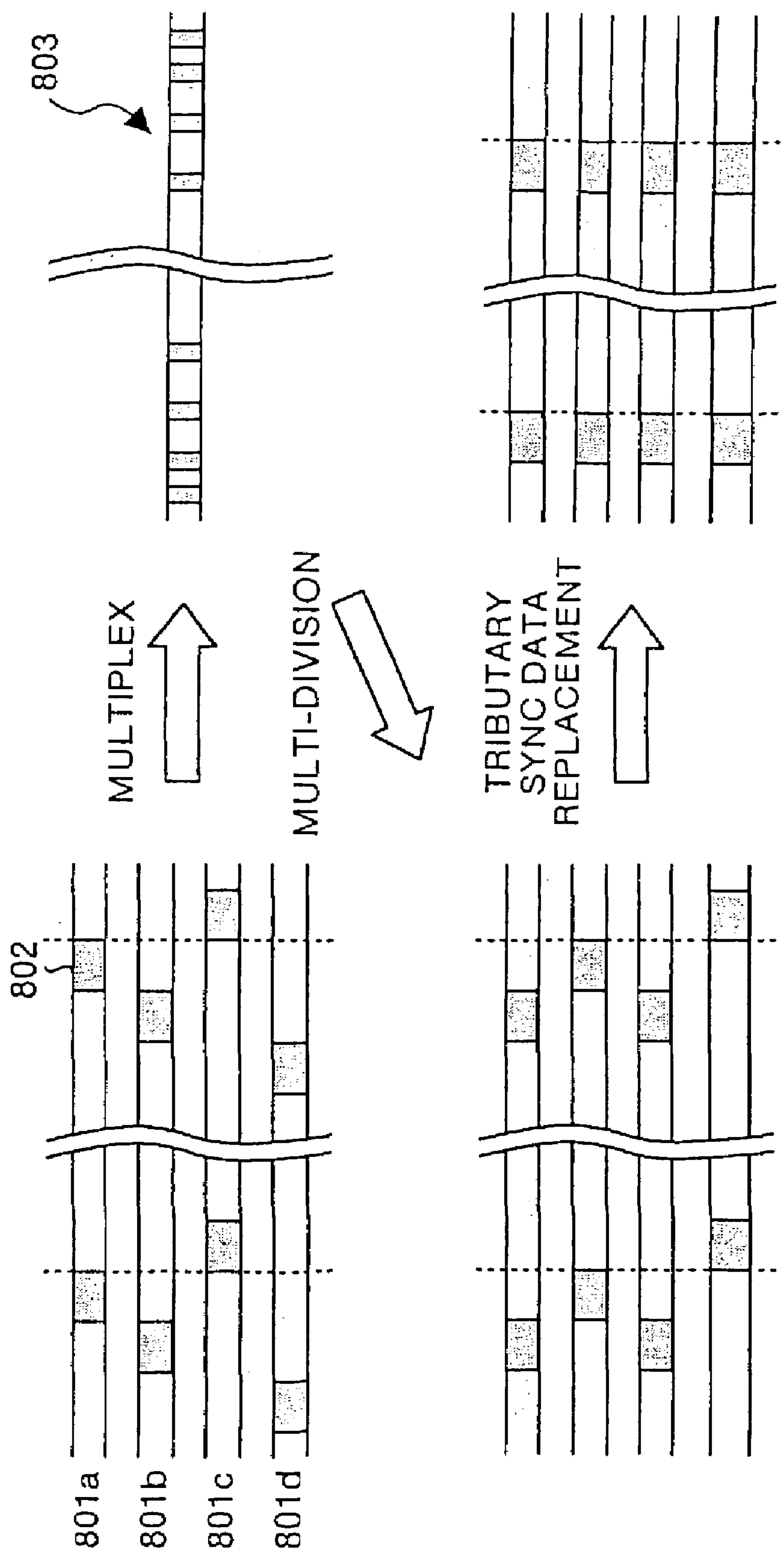
FIG. 3 is an illustration describing positions of frame bits contained in data associated with actions of the data transmission and reception system according to the first embodiment.

FIG. 3 is an illustration describing positions of frame bits contained in data associated with actions of the data transmission and reception system according to the first embodiment. As shown in FIG. 3, at the data transmitter 10 end, tributary signals 801*a*, 801*b*, 801*c*, and 801*d* have their frame bits 802 inserted thereto, and are transmitted as a multiplexed signal 803 for which simply a bit synchronization is done, but no frame phase synchronization is performed.

At the data receiver 20 end, upon multi-division of the multiplexed signal 803, there develops a slip in frame bit position of each tributary signal in dependence on a timing of that conversion, which however does constitute no problem, as the frame bit position between tributary signals inherently is not matching. In this condition, frame bit phases are matched by the tributary synchronization circuit 106, and then a data replacement is performed by the data replacement circuit 107.

The tributary signals, arranged in a proper order by the data replacement circuit 107, are input to the decoding circuit 108. At the decoding circuit 108, input tributary signals are each decoded relative to a coding made in the data transmitter 10, to be input to the parallel-serial conversion circuit 109. At the parallel-serial conversion circuit 109, decoded tributary signals are again multiplexed to return to an original data signal 115.

As described hitherto, according to the first embodiment, a data transmission and reception system comprises a data transmitter 10 in which a signal to be transmitted is multi-divided into a plurality of tributary signals to be coded and, thereafter, again multiplexed to be transmitted as a simply bit-synchronized high-speed signal 113, and a data receiver 20 which multi-divides the high-speed signal 113 it has received from a transmission path 110, into a plurality of tributary signals, detects a frame bit of a respective tributary signal, responding to a reference frame pulse for a match in frame phase of the tributary signal, and reproduces the original transmission signal through a data replacement circuit 107 and a decoding circuit 108, thereby allowing for phase adjustment to be made for an arbitrary bit of an input to a parallel-serial conversion circuit 104 at the data transmitter 10 end, and a flexible coping even with phase slips of 1 bit or more due to dispersion of devices or in design accrued by an incase in speed of communication system.

Figure 4:
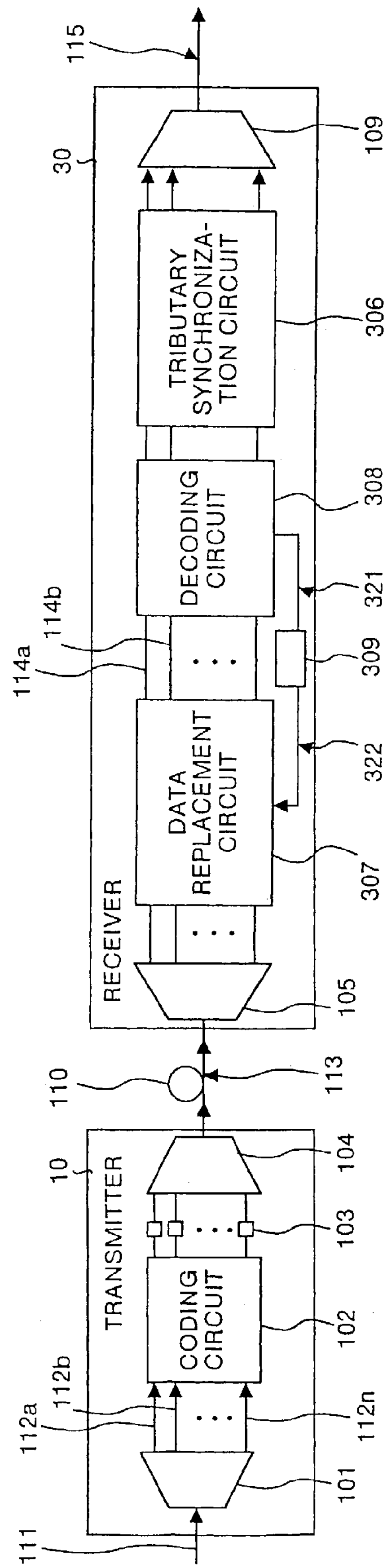
FIG. 4 is a block diagram showing a schematic arrangement of a data transmission and reception system according to a second embodiment of the invention.

The data transmission and reception system with a data transmitter and a data receiver according to a second embodiment of the invention will now be explained. FIG. 4 is a block diagram showing a schematic arrangement of a data transmission and reception system according to a second embodiment of the invention.

This data transmission and reception system according to the second embodiment has a data receiver 30 in place of the data receiver 20 of FIG. 1. This data receiver 30 includes, in order subsequent to a serial-parallel conversion circuit 105, a data replacement circuit 307, a decoding circuit 308, and a tributary synchronization circuit 306, in which the data replacement circuit 307 and the tributary synchronization circuit 306 are operative in response to a frame bit and tributary ID information to be detected at the decoding circuit 308.

Thus, in FIG. 4, only the data receiver 30 is different from the data receiver 20 that constitutes the data transmission and reception system according to the first embodiment, and description is omitted of the data receiver 10 to be analogous in arrangement and operation.

The data receiver 30 is constituted with the serial-parallel conversion circuit 105 that multi-divides a high-speed serial signal 113 to respective tributary signals 114*a*, 114*b*, . . . , 114*n*. The data replacement circuit 307 performs replacement of data between the tributary signals 114*a* to 114*n* multi-divided by the serial-parallel conversion circuit 105 in dependence on a later-described data replacement control signal 322. The decoding circuit 308 detects a frame bit of each of the tributary signals 114*a* to 114*n* output from the data replacement circuit 307, to output a frame pulse, and for performing a detection of the tributary ID information and a decoding of each tributary signal. The tributary synchronization circuit 306 obtains a match in phase of signal frames between tributary signals output from the decoding circuit 308 in dependence on the frame pulse. Finally, the parallel-serial conversion circuit 109 performs parallel-serial conversion of respective tributary signals to reproduce an original data signal 115.

Figure 5:
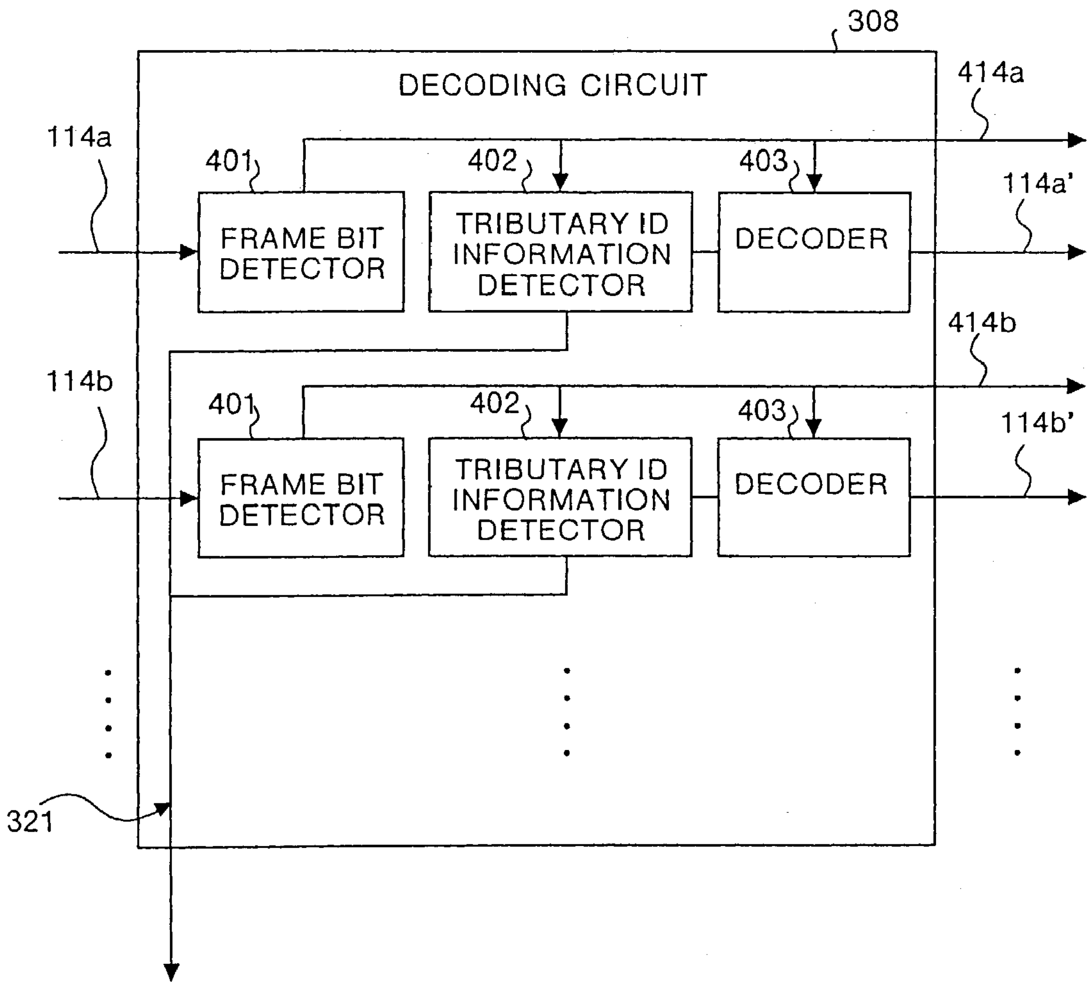
FIG. 5 is a block diagram showing a schematic arrangement of a decoding circuit of the data transmission and reception system according to the second embodiment.

FIG. 5 is a block diagram showing a schematic arrangement of the decoding circuit 308. This decoding circuit 308 is constituted with a frame bit detector 401 that detects a position of a frame bit inserted in each of the tributary signals 114*a* to 114*n* to generate a frame pulse. Further, a tributary ID information detector 402 is provided which is adapted, in a timing based on the frame pulse, for detecting the tributary ID information of each tributary signal to generate a tributary ID signal. A decoder 403 is provided which is adapted, in a timing based on the frame pulse, for decoding a respective one of the tributary signals 114*a* to 114*n* to output a corresponding one of tributary signals 114*a*' to 114*n*'.

Figure 6:
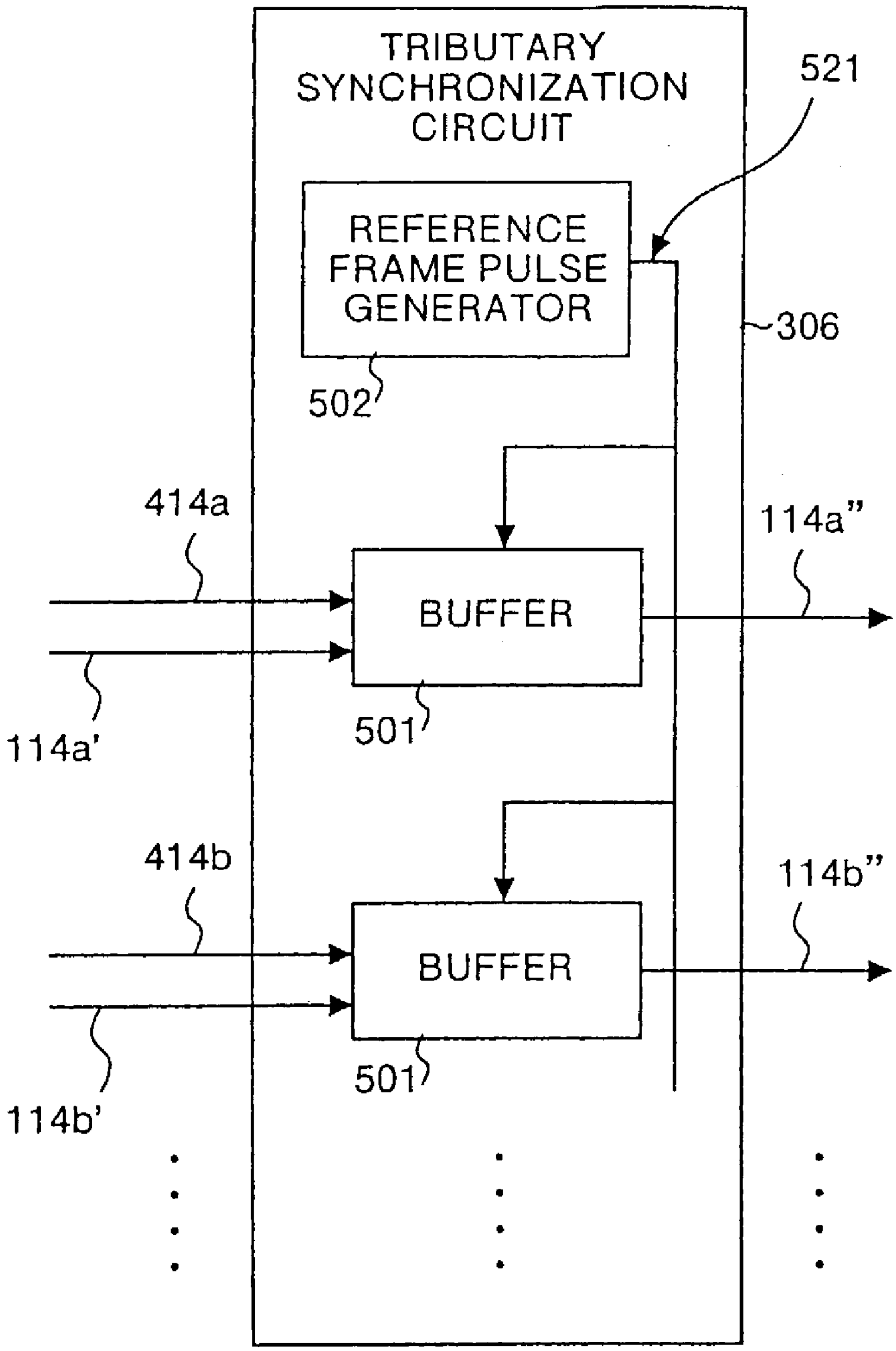
FIG. 6 is a block diagram showing a schematic arrangement of a tributary synchronization circuit of the data transmission and reception system according to the second embodiment.

FIG. 6 is a block diagram showing a schematic arrangement of the tributary synchronization circuit 306. This tributary synchronization circuit 306 is constituted with buffers 501 that individually store the tributary signals 114$a'$ to 114$n'$ output from the decoding circuit 308. Further, a reference frame pulse generator 502 is provided that generates a reference frame pulse 521 to be a timing for outputting tributary signals stored in the buffers 501.

How the data receiver 30 functions will now be explained. At the data receiver 30, a high-speed signal 113 received from a transmission path 110 is input to the serial-parallel conversion circuit 105. At the serial-parallel conversion circuit 105, the high-speed signal 113 is parallel converted into tributary signals 114$a$ to 114$n$, to be thereby multi-divided. Then, the tributary signals parallel converted by the serial-parallel conversion circuit 105 are input to the data replacement circuit 307.

At the data replacement circuit 307, there is input a data replacement control signal 322 output from a later-described data replacement control circuit 309, and respective tributary signals are replaced in order in accordance with tributary ID information indicated by the data replacement control signal 322.

At the decoding circuit 308, as shown in FIG. 5, respective input tributary signals are input to the frame bit detector 401. At the frame bit detector 401, based on a respective input tributary signal, there is detected a position of the frame bit, and as a result thereof a corresponding one of frame pulses 414$a$ to 414$n$ is output. Respective frame pulses 414$a$ to 414$n$ are input to the tributary ID information detector 402, the decoder 403, and a tributary synchronization circuit 306 in the next stage.

At the tributary ID information detector 402, based on the frame pulse, there is detected the tributary ID information from a respective having passed the frame bit detector, to be output as a tributary ID signal 321. The tributary ID signal 321 is input, as shown in FIG. 4, to the data replacement control circuit 309. At the data replacement control circuit 309, a decision is made of whether or not tributary ID information indicated by the tributary ID signal 321 matches with a predetermined ID, and in the case of a failed matching, a data replacement control signal 322 is output to the data replacement circuit 307.

Respective tributary signals having passed the tributary ID information detector 402 are input to the decoder 403. At the decoder 403, input tributary signals are decoded relative to a coding performed in the data transmitter 10, to be output to the tributary synchronization circuit 306 in the next stage.

At the tributary synchronization circuit 306, as shown in FIG. 6, data indicated by the tributary signals 114$a'$ to 14$n'$ output from the decoding circuit 308 are written in the buffers 501, as necessary, while the reference frame pulse generator 502 inputs a reference frame pulse 521 to the buffers 501.

The reference frame pulse 521 generated by the reference frame pulse generator 502 is a signal representing a timing for written data in the buffers 501 to be concurrently output from the tributary synchronization circuit 306, like the reference frame pulse 211 described in connection with the first embodiment.

In regard of the tributary synchronization circuit 306, it is noted that each buffer 501 is adapted to input the frame pulse also, and to be based on the frame pulse as a reference for determining an address in the buffer to be a destination of writing of data representing an input tributary signal. For example, of data representing tributary signals, that part input together with a frame pulse may be written in a particular address (e.g., an address for writing a frame bit), and those data subsequent thereto may be written in addresses contiguous from the particular address or associated by predetermined relationships.

At each buffer 501, when a reference frame pulse 521 is input from the reference frame pulse generator 502, data therein is read in order from the particular address, thereby permitting tributary signals 114$a''$ to 114$n''$ to be output with a matching frame bit phase. Therefore, slips between frame bits can be absorbed at the buffers 501, thereby implementing a tributary synchronization.

The signals 114$a''$ to 114$n''$ matching in frame phase are then input to the parallel-serial conversion circuit 109, where they are again multiplexed to return to the original data signal 115.

As described hitherto, according to the second embodiment, a data transmission and reception system includes a data receiver 30 which multi-divides a high-speed signal 113 it has received from a transmission path 110, into a plurality of tributary signals, detects a frame bit of a respective tributary signal, while detecting tributary ID information thereof, performs a data replacement in dependence on a fed back input of the detected tributary ID information, reads tributary signals in response to a reference frame pulse from buffers 501 in which tributary signals are written in addresses to be heading as determined by the detected frame bit, thereby matching frame phases, and thereafter, reproduces an original transmission signal, so that frame phase slips between tributary signals can be absorbed at the buffers 501, and like the first embodiment, normal data transmission can be implemented even if phase slips due to dispersion of devices are 1 bit or more, allowing a flexible coping with high-speed communications.

The data transmission and reception system with a data transmitter and a data receiver according to a third embodiment of the invention will now be explained. The data transmission and reception system according to the third embodiment is different from the first and second embodiments in that the data transmitter employs a later-described bit synchronization circuit in place of the delay circuit 103 shown in the first embodiment. Therefore, the data receiver constituting the data transmission and reception system according to the third embodiment can be substituted with the data receiver 20 or 30 shown in the first or second embodiment, and description thereof is omitted.

Figure 7:
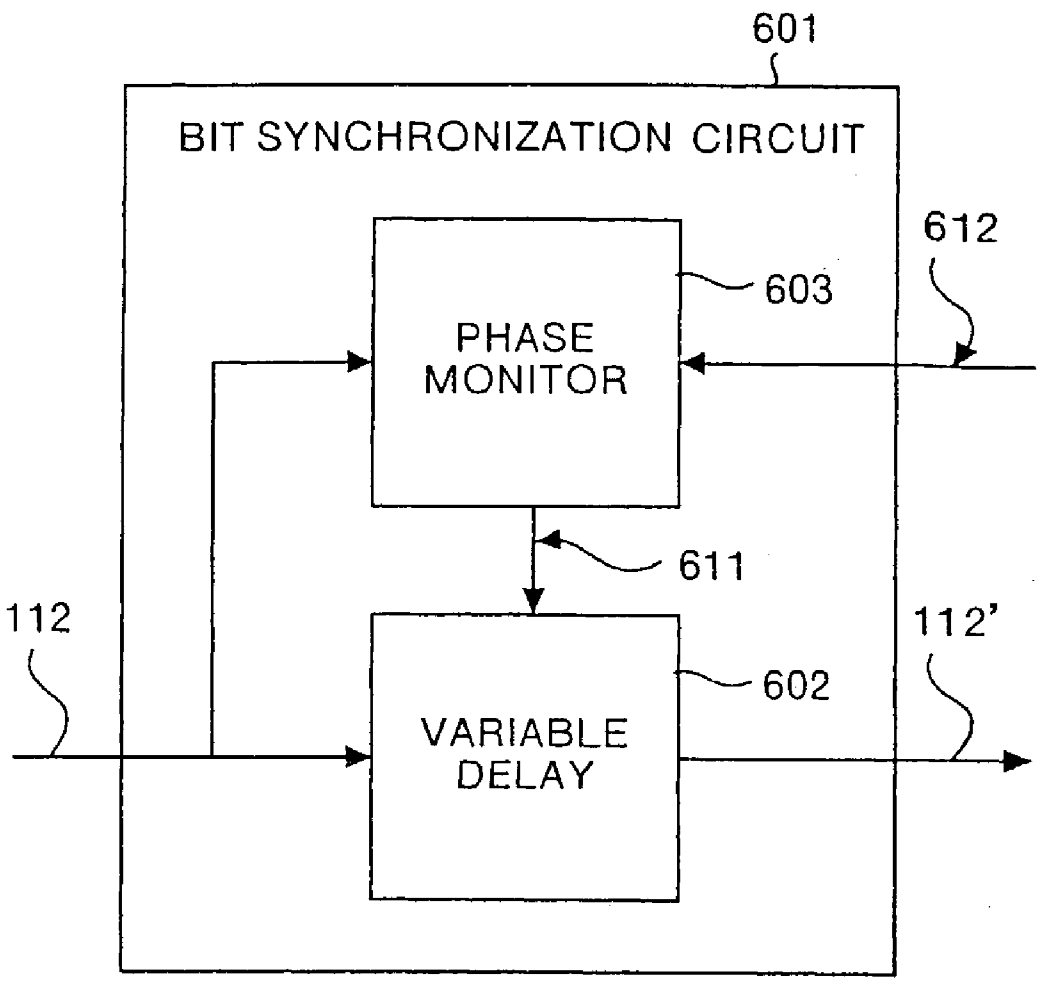
FIG. 7 is a block diagram showing a schematic arrangement of a data transmission and reception system according to a third embodiment of the invention.
Figure 8:
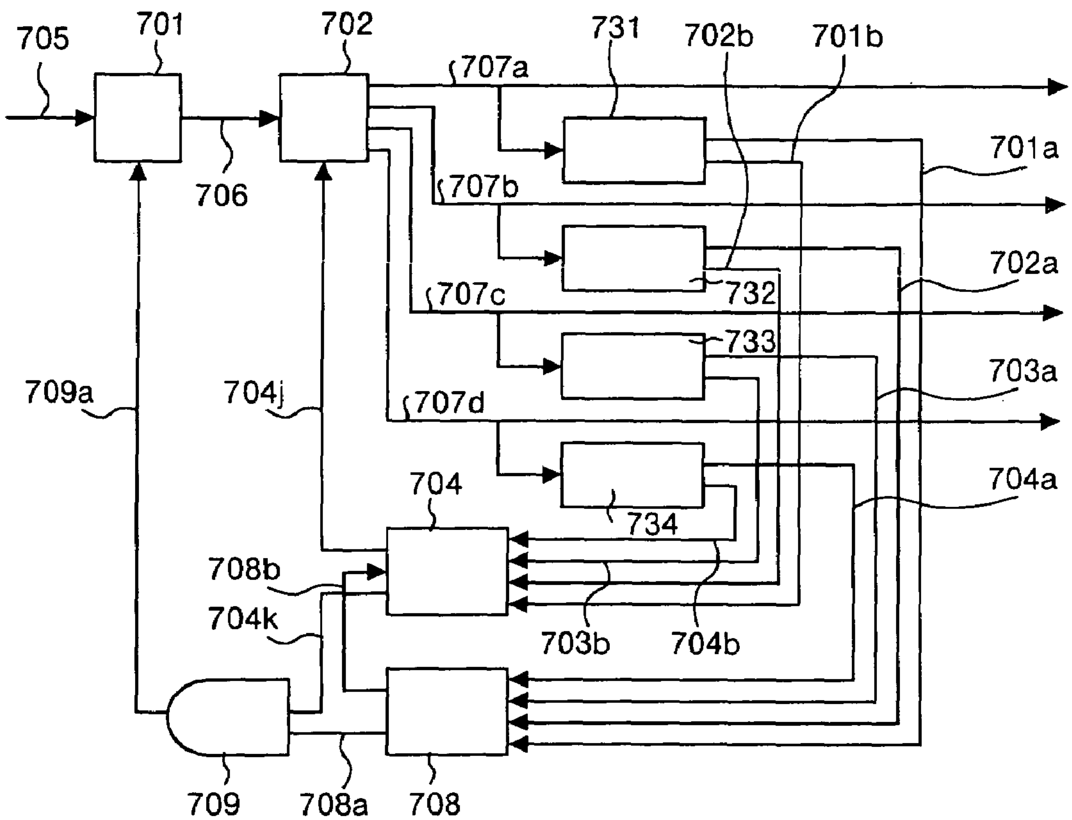
FIG. 8 is a block diagram showing a schematic arrangement of a conventional synchronism detection circuit.
Figure 9:
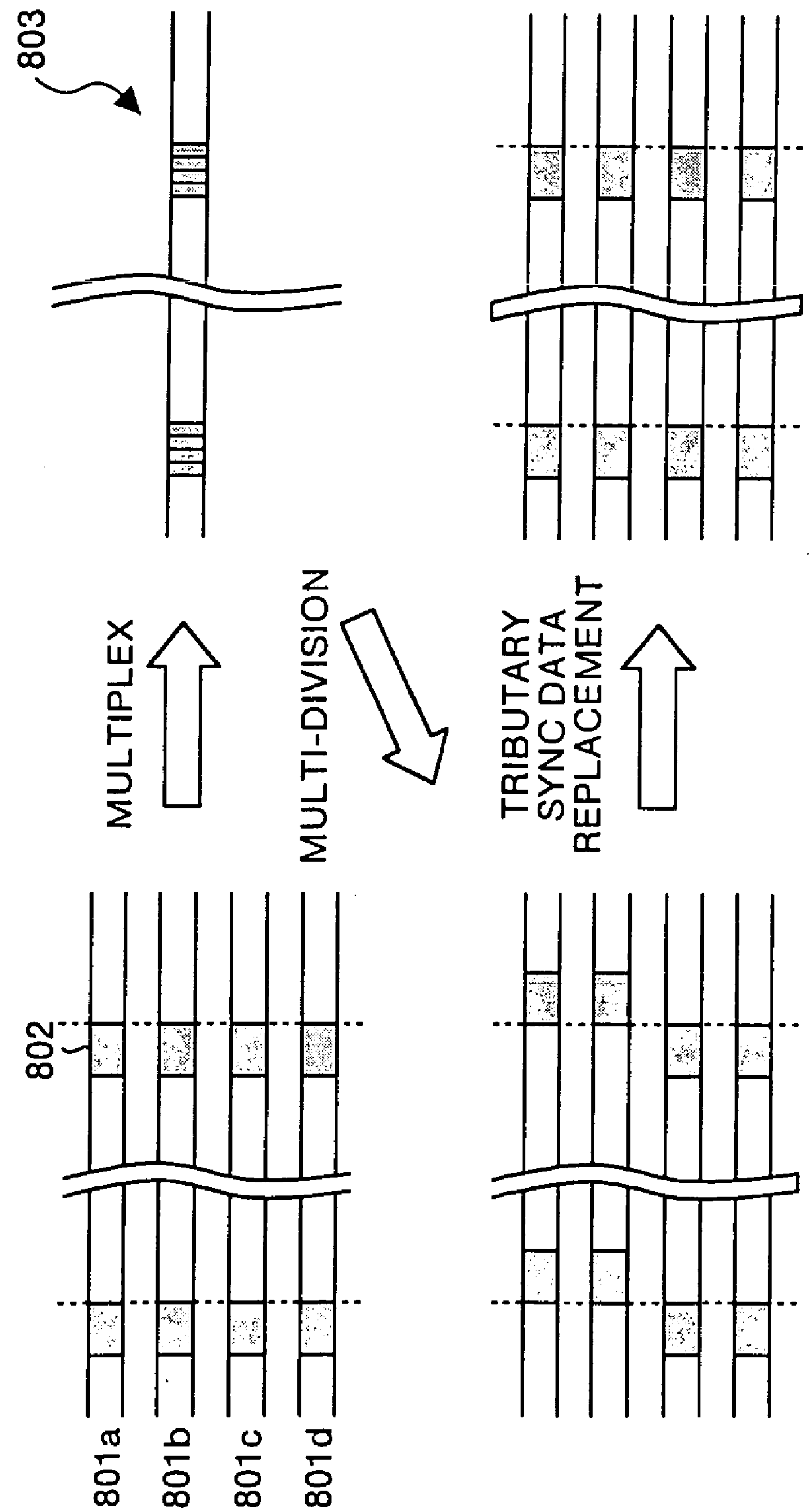
FIG. 9 is an illustration describing positions of frame bits contained in data associated with actions of the conventional synchronism detection circuit.

FIG. 7 is a block diagram showing a schematic arrangement of a bit synchronization circuit according to the third embodiment. This bit synchronization circuit 601 is constituted with a phase monitor 603 that monitors the phase of a tributary signal 112 output from a coding circuit 102. Further, a variable delay 602 is provided that controls a delay time of the tributary signal 112 in dependence on a phase slip signal 611 output from the phase monitor 603.

How this bit synchronization circuit 601 functions will now be explained. Referring to FIG. 7, the tributary signal 112 which is coded by the coding circuit 102 is input to the phase monitor 112 and the variable delay 602. The phase monitor 603 monitors a phase slip of the tributary signal 112 relative to a cock 612 to be input to the bit synchronization circuit 601, and outputs the phase slip signal 611 representing the phase slip.

On the other hand, the variable delay 602, which inputs the tributary signal 112 and the phase slip signal output from the phase monitor 603, causes the tributary signal 112 to be delayed by a period of time by which a phase slip the phase slip signal represents can be cancelled, to output the delayed tributary signal 112.

The bit synchronization circuit 601 is provided, like the delay circuit 103 in the first embodiment, for each of tributary signals 112_a_ to 112_n_, so that bit phases between a plurality of tributary signals 112_a_ to 112_n_ can finally be matched by a phase slip correction based on the above-noted clock.

Incidentally, the data transmitter provided with bit synchronization circuits 601 is adapted, like the data transmitter 10 shown in the first embodiment, to simply perform a bit phase synchronization using the bit synchronization circuits 601, without the need of a frame phase synchronization.

As described hitherto, according to the third embodiment, a data transmission and reception system includes a data transmitter which is provided, for a bit phase synchronization of a plurality of tributary signals, with bit synchronization circuits for controlling delay times of the tributary signals 112 in dependence on phase slips to be detected on a basis of the common clock 612, allowing a prompt correction even of phase slips between a plurality of tributary signals 112 that may have variations, such as by intrusion of heat or noises or deviation of timing associated with the conversion from a high-speed signal to low-speed signals, thus permitting a stable bit synchronization to be implemented in data transmission.

As will be seen from the foregoing embodiments, according to one aspect of the invention, a data transmitter is adapted to transmit on a transmission path a signal which is simply bit-synchronized for synchronization between tributary signals with frames formed therefor, and a data receiver receiving that signal is adapted, for a respective one of tributary signals into which the signal is multi-divided, for storing a data indicated by the tributary signal to output the data in a timing based on a detection of a frame bit of the tributary signal and a reference frame pulse, to thereby implement a tributary synchronization, so that frames can have a matching phase at the reception end, without the need of a frame synchronization at the transmission end, and there is allowed a flexible coping even with phase slips of 1 bit or more due to dispersion of devices or in design accrued by an incase in speed of communication system.

According to another aspect of the invention, the data transmitter is constituted with a first serial-parallel conversion circuit, a coding circuit, a delay circuit, and a first parallel-serial conversion circuit to perform in this order a multi-division of a transmission signal into tributary signals, frame formation, bit synchronization, and multiplexing transmission, and the data receiver is constituted with a second serial-parallel conversion circuit, a tributary synchronization circuit, a data replacement circuit, a decoding circuit, and a second parallel-serial conversion circuit to perform in this order a multi-division of a transmission signal into tributary signals, output of respective tributary signal in a timing based on a detection of frame bit and a reference frame pulse, replacement of data based on tributary ID information, decoding relative to frame formation, and re-multiplexing for reproduction of the transmission signal, thereby implementing a tributary synchronization at the reception end, so that without needing a frame synchronization at the data transmitter, there can be obtained a match in phase of frames at the tributary synchronization circuit in the data receiver, permitting the transmission signal to be reproduced, and there can be implemented a tributary synchronization even with phase slips of 1 bit or more due to dispersion in phase of frames accrued by an incase in speed of communication system.

According to still another aspect of the invention, the tributary synchronization circuit is adapted to store in a buffer a data indicated by a tributary signal, and take out the data in timing determined by combination of a frame pulse output from a frame bit detector and a reference frame pulse generated by a reference frame pulse generator, thereby allowing respective tributary signals to be output with a match in phase of frame bits between tributary signals, and there can be implemented a high-speed tributary synchronization.

According to still another aspect of the invention, the data transmitter is constituted with a first serial-parallel conversion circuit, a coding circuit, a delay circuit, and a first parallel-serial conversion circuit to perform in this order a multi-division of a transmission signal into tributary signals, frame formation, bit synchronization, and multiplexing transmission, and the data receiver is constituted with a second serial-parallel conversion circuit, a data replacement circuit, a decoding circuit, a data replacement control circuit, a tributary synchronization circuit, and a second parallel-serial conversion circuit to perform in this order a multi-division of a transmission signal into tributary signals, replacement of data in dependence on a data replacement control signal, decoding relative to frame formation based on an output of a tributary ID signal by detection of tributary ID information and output of a frame pulse by detection of frame bit, output of a respective tributary signal in a timing based on a detection of the frame pulse and a reference frame pulse, output of the data replacement control signal in dependence on the tributary ID signal, output of the respective tributary signal in a timing based on the frame pulse and the reference frame pulse, and re-multiplexing for reproduction of the transmission signal, thereby implementing a tributary synchronization at the reception end, so that without needing a frame synchronization at the data transmitter, there can be obtained a match in phase of frames at the tributary synchronization circuit in the data receiver, permitting the transmission signal to be reproduced, and there can be implemented a high-speed tributary synchronization even by use of a tributary signal after decoding.

According to still another aspect of the invention, the decoding circuit is adapted to detect a frame bit at a frame bit detector, thereby outputting a frame pulse, and in a timing based on the frame pulse, to detect tributary ID information at a tributary ID information detector, thereby generating a tributary ID signal, and perform a decoding at a decoder relative to frame formation, thereby allowing for a tributary signal after the decoding to be supplied, together with the frame pulse, to the tributary synchronization circuit in the next stage, and there can be eliminated influences of a delay for detection of tributary ID information in a synchronizing action of the tributary synchronization circuit.

According to still another aspect of the invention, the tributary synchronization circuit is adapted to store data indicated by tributary signals, in order from an address in a buffer, as it is determined by a frame pulse, and take out the data, in order from the address, in a timing determined in dependence on a reference frame pulse generated by a reference frame pulse generator, so that by letting that address, for example, be an address for a frame bit to be written, respective tributary signals can be output with a match in phase of frame bits between tributary signals, and there is enabled a tributary synchronization even of a signal for which no frame synchronization is performed at the reception end.

According to still another aspect of the invention, the data transmitter is allowed to employ a bit synchronization circuit adapted, as a circuit for performing a bit synchronization, to detect a phase slip relative to a common clock between tributary signals, and have a respective tributary signal delayed in accordance with the detected phase slip, and there is allowed a flexible coping even with variations of bit phase, without the need of consideration to be taken in design phase for the range of adjustment in amount of a delay that may occur in signal transmission.

According to still another aspect of the invention, a data receiver receiving a signal from a transmission path is adapted, for a respective one of tributary signals into which the signal is multi-divided, for storing a data indicated by the tributary signal to output the data in a timing based on a detection of a frame bit of the tributary signal and a reference frame pulse, to thereby implement a tributary synchronization, so that frames can have a matching phase at the reception end, without the need of a frame synchronization at the transmission end, and there is allowed a flexible coping even with phase slips of 1 bit or more due to dispersion of devices or in design accrued by an incase in speed of communication system.

According to still another aspect of the invention, the data receiver is constituted with a serial-parallel conversion circuit, a tributary synchronization circuit, a data replacement circuit, a decoding circuit, and a parallel-serial conversion circuit to perform in this order a multi-division of a transmission signal into tributary signals, output of respective tributary signal in a timing based on a detection of frame bit and a reference frame pulse, replacement of data based on tributary ID information, decoding relative to frame formation, and re-multiplexing for reproduction of the transmission signal, thereby implementing a tributary synchronization at the reception end, so that even of a signal for which no frame synchronization is performed at the data transmitter, there can be obtained a match in phase of frames at the tributary synchronization circuit in the data receiver, permitting the transmission signal to be reproduced, and there can be implemented a tributary synchronization even with phase slips of 1 bit or more due to dispersion in phase of frames accrued by an incase in speed of communication system.

According to still another aspect of the invention, the tributary synchronization circuit is adapted to store in a buffer a data indicated by a tributary signal, and take out the data in timing determined by combination of a frame pulse output from a frame bit detector and a reference frame pulse generated by a reference frame pulse generator, thereby allowing respective tributary signals to be output with a match in phase of frame bits between tributary signals, and there can be implemented a high-speed tributary synchronization.

According to still another aspect of the invention, the data receiver is constituted with a serial-parallel conversion circuit, a data replacement circuit, a decoding circuit, a data replacement control circuit, a tributary synchronization circuit, and a parallel-serial conversion circuit to perform in this order a multi-division of a transmission signal into tributary signals, replacement of data in dependence on a data replacement control signal, decoding relative to frame formation based on an output of a tributary ID signal by detection of tributary ID information and output of a frame pulse by detection of frame bit, output of a respective tributary signal in a timing based on a detection of the frame pulse and a reference frame pulse, output of the data replacement control signal in dependence on the tributary ID signal, output of the respective tributary signal in a timing based on the frame pulse and the reference frame pulse, and re-multiplexing for reproduction of the transmission signal, thereby implementing a tributary synchronization at the reception end, so that without needing a frame synchronization at the data transmitter, there can be obtained a match in phase of frames at the tributary synchronization circuit in the data receiver, permitting the transmission signal to be reproduced, and there can be implemented a high-speed tributary synchronization even by use of a tributary signal after decoding.

According to still another aspect of the invention, the decoding circuit is adapted to detect a frame bit at a frame bit detector, thereby outputting a frame pulse, and in a timing based on the frame pulse, to detect tributary ID information at a tributary ID information detector, thereby generating a tributary ID signal, and perform a decoding at a decoder relative to frame formation, thereby allowing for a tributary signal after the decoding to be supplied, together with the frame pulse, to the tributary synchronization circuit in the next stage, and there can be eliminated influences of a delay for detection of tributary ID information in a synchronizing action of the tributary synchronization circuit.

According to still another aspect of the invention, the tributary synchronization circuit is adapted to store data indicated by tributary signals, in order from an address in a buffer, as it is determined by a frame pulse, and take out the data, in order from the address, in a timing determined in dependence on a reference frame pulse generated by a reference frame pulse generator, so that by letting that address, for example, be an address for a frame bit to be written, respective tributary signals can be output with a match in phase of frame bits between tributary signals, and there is enabled a tributary synchronization even of a signal for which no frame synchronization is performed at the reception end.

According to still another aspect of the invention, the data transmitter is allowed to employ a bit synchronization circuit adapted, as a circuit for performing a bit synchronization, to detect a phase slip relative to a common clock between tributary signals, and have a respective tributary signal delayed in accordance with the detected phase slip, and there is allowed a flexible coping even with variations of bit phase, without the need of consideration to be taken in design phase for the range of adjustment in amount of a delay that may occur in signal transmission.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A data transmission and reception system comprising:

a data transmitter which multi-divides a transmission signal into a plurality of low-speed tributary signals, forms a frame for every tributary signal, thereafter multiplexes the tributary signals into a high-speed serial signal and transmits the high-speed serial signal through a transmission path; and a data receiver which receives the serial signal through the transmission path, multi-divides the received serial signal into the plurality of low-speed tributary signals, performs tributary synchronization with respect to every tributary signal, thereafter multiplexes the tributary signals into the high-speed serial signal and reproduces the transmission signal, wherein the data transmitter, when forming the frame for every tributary signal, inserts, into the frame a frame bit indicating a boundary of the frame and, after having formed the frame, performs only a bit synchronization with respect to every tributary signal, and wherein the data receiver, for a respective tributary signal, stores a data indicated by the tributary signal and, in a timing based on a detection of the frame bit of the tributary signal and a reference frame pulse commonly issued between tributary signals, outputs the stored data to thereby perform the tributary synchronization.

2. The data transmission and reception system according to claim 1, wherein the data transmitter comprises:

a first serial-parallel conversion circuit which multi-divides the transmission signal into the plurality of tributary signals;

a coding circuit, for the respective tributary signal, forms the frame containing the frame bit and tributary ID information for identifying the tributary signal;

a delay circuit which performs the bit synchronization for a respective tributary signal of which the frame is formed by the coding circuit; and a first parallel-serial conversion circuit which multiplexes the tributary signals, of which a respective one is processed for the bit synchronization by the delay circuit, into the high-speed serial signal to be sent to the transmission path, and wherein the data receiver comprises:

a second serial-parallel conversion circuit which multi-divides the high-speed serial signal received through the transmission path, into the plurality of tributary signals;

a tributary synchronization circuit which, for the respective tributary signal, stores a data indicated by the tributary signal and detects the tributary ID information and the frame bit of the tributary signal, to output the stored data in dependence on a detection of the frame bit and a reference frame pulse commonly issued between tributary signals;

a data replacement circuit which replaces the data indicated by tributary signals, of which a respective one is processed for the tributary synchronization by the tributary synchronization circuit, in dependence on the tributary ID information;

a decoding circuit which, for the respective tributary signal for which the replacement is made by the data replacement circuit, performs decoding corresponding to a coding by the coding circuit; and a second parallel-serial conversion circuit which multiplexes the tributary signals, of which a respective one is decoded by the decoding circuit, into the high-speed serial signal to reproduce the transmission signal.

3. The data transmission and reception system according to claim 2, wherein the tributary synchronization circuit comprises:

a frame bit detector which detects the frame bit of the respective tributary signal to output a frame pulse;

a reference frame pulse generator which generates the reference frame pulse; and a buffer which, for the respective tributary signal, stores a data indicated by the tributary signal and, in a timing based on the frame pulse and the reference frame pulse, outputs the data with a match in phase of frame bits between tributary signals.

4. The data transmission and reception system according to claim 1, wherein the data transmitter comprises:

a first serial-parallel conversion circuit which multi-divides the transmission signal into the plurality of tributary signals;

a coding circuit which, for the respective tributary signal, forms the frame containing the frame bit and tributary ID information for identifying the tributary signal;

a delay circuit which performs the bit synchronization for the respective tributary signal of which the frame is formed by the coding circuit; and a first parallel-serial conversion circuit multiplexes the tributary signals, of which a respective one is processed for the bit synchronization by the delay circuit, into the high-speed serial signal to be sent to the transmission path, and wherein the data receiver comprises:

a second serial-parallel conversion circuit which multi-divides the high-speed serial signal received through the transmission path, into the plurality of tributary signals;

a data replacement circuit which performs replacement, between data indicated by the plurality of tributary signals, in dependence on a data replacement control signal;

a decoding circuit which, for the respective tributary signal for which the replacement is made by the data replacement circuit, detects the frame bit of the tributary signal to output a frame pulse and for detecting the tributary ID information to output a tributary ID signal, to thereby perform a decoding of the tributary signal corresponding to a coding by the coding circuit;

a data replacement control circuit which decides whether or not the tributary ID information indicated by the tributary ID signal matches predetermined ID information, to be responsible for no match to output the data replacement control signal;

a tributary synchronization circuit which, for the respective tributary signal, temporarily stores the data indicated by the tributary signal, and based on the frame pulse and a reference frame pulse commonly issued between tributary signals, outputs the stored data; and a second parallel-serial conversion circuit which multiplexes the tributary signals, of which a respective one is processed for a tributary synchronization by the tributary synchronization circuit, into a high-speed serial 5 signal to reproduce the transmission signal.

5. The data transmission and reception system according to claim 4, wherein, for the respective tributary signal for which the replacement is made by the data replacement circuit, the decoding circuit comprises:

a frame bit detector which detects the frame bit of the tributary signal to generate a frame pulse;

a tributary ID information detector which, in a timing based on the frame pulse, detects the tributary ID information of the tributary signal to generate a tributary ID signal; and a decoder which performs, in a timing based on the frame pulse, for the tributary signal, decoding corresponding to a coding by the coding circuit, and outputs the frame pulse, the tributary ID signal, and the tributary signal for which the decoding is performed.

6. The data transmission and reception system according to claim 4, wherein the tributary synchronization circuit comprises:

a reference frame pulse generator which generates the reference frame pulse; and a buffer which, for the respective tributary signal, stores the data indicated by the tributary signal in order in an address determined on bases of the frame pulse and a predetermined address for the frame bit to be written and, in a timing based on the reference frame pulse, outputs the data from the predetermined address.

7. The data transmission and reception system according to claim 2, wherein the data transmitter having, in place of the delay circuit, a bit synchronization circuit, wherein said bit synchronization circuit, for the respective tributary signal for which the frame is formed by the coding circuit, detects a phase slip of the tributary signal relative to a common clock signal between tributary signals and delays the tributary signal in accordance with the detected phase slip to thereby perform a bit synchronization.

8. The data transmission and reception system according to claim 4, wherein the data transmitter having, in place of the delay circuit, a bit synchronization circuit, wherein said bit synchronization circuit, for the respective tributary signal for which the frame is formed by the coding circuit, detects a phase slip of the tributary signal relative to a common clock signal between tributary signals and delays the tributary signal in accordance with the detected phase slip to thereby perform a bit synchronization.

9. A data receiver which receives a high-speed serial signal through a transmission path, which serial signal is obtained by multi-dividing a transmission signal into a plurality of low-speed tributary signals, forming a frame for every tributary signal, thereafter multiplexing the tributary signals into a high-speed serial signal and transmitting the high-speed serial signal through the transmission path, which data receiver multi-divides the received serial signal into the plurality of low-speed tributary signals, performs tributary synchronization with respect to every tributary signal, thereafter multiplexes the tributary signals into the high-speed serial signal and reproduces the transmission signal, wherein the data receiver, for a respective tributary signal, stores a data indicated by the tributary signal and detects, from the tributary signal, a frame bit indicating a boundary of the frame, to output the stored data in a timing based on the detected frame bit and a reference frame pulse commonly issued between tributary signals, to thereby perform the tributary synchronization.

10. The data receiver according to claim 9, comprising:

a serial-parallel conversion circuit which multi-divides the high-speed serial signal received through the transmission path, into the plurality of tributary signals;

a tributary synchronization circuit which, for the respective tributary signal, stores the data indicated-by the tributary signal and detecting the frame bit of the tributary signal and tributary ID information for identifying the tributary signal, to output the stored data in dependence on a detection of the frame bit and a reference frame pulse commonly issued between tributary signals;

a data replacement circuit which performs replacement of data indicated by tributary signals, of which a respective one is processed for a tributary synchronization by the tributary synchronization circuit, in dependence on the tributary ID information;

a decoding circuit which, for the respective tributary signal for which the replacement is made by the data replacement circuit, performs decoding; and a parallel-serial conversion circuit which multiplexes the tributary signals, of which a respective one is decoded by the decoding circuit, into the high-speed serial signal to reproduce the transmission signal.

11. The data receiver according to claim 10, wherein the tributary synchronization circuit comprises:

a frame bit detector detects the frame bit of the respective tributary signal to output a frame pulse;

a reference frame pulse generator which generates the reference frame pulse; and a buffer which, for the respective tributary signal, stores the data indicated by the tributary signal and, in a timing based on the frame pulse and the reference frame pulse, outputs the data with a match in phase of frame bits between tributary signals.

12. The data receiver according to claim 9, comprising:

a serial-parallel conversion circuit which multi-divides the high-speed serial signal received through the transmission path, into a plurality of tributary signals;

a data replacement circuit which performs replacement, between data indicated by the plurality of tributary signals, in dependence on a data replacement control signal;

a decoding circuit which, for the respective tributary signal for which the replacement is made by the data replacement circuit, detects the frame bit of the tributary signal to output a frame pulse and for detecting the tributary ID information to output a tributary ID signal, to thereby perform decoding of the tributary signal;

a data replacement control circuit which decides whether or not the tributary ID information indicated by the tributary ID signal matches predetermined ID information, to be responsible for no match to output the data replacement control signal;

a tributary synchronization circuit which, for the respective tributary signal, temporarily stores a data indicated by the tributary signal, and based on the frame pulse and a reference frame pulse commonly issued between tributary signals, outputs the stored data; and a parallel-serial conversion circuit which multiplexes the tributary signals, of which a respective one is processed for a tributary synchronization by the tributary synchronization circuit, into the high-speed serial signal to reproduce the transmission signal.

13. The data receiver according to claim 12, wherein for the respective tributary signal for which the replacement is made by the data replacement circuit, the decoding circuit comprises:

a frame bit detector which detects the frame bit of the tributary signal to generate a frame pulse;

a tributary ID information detector which, in a timing based on the frame pulse, detects the tributary ID information of the tributary signal to generate the tributary ID signal; and a decoder which, in a timing based on the frame pulse, perform decoding, for the tributary signal, and outputs the frame pulse, the tributary ID signal, and the tributary signal for which the decoding is performed.

14. The data receiver according to claim 12, wherein the tributary synchronization circuit comprises:

a reference frame pulse generator which generates the reference frame pulse; and a buffer which, for the respective tributary signal, stores a data indicated by the tributary signal in order in an address determined on bases of the frame pulse and a predetermined address for the frame bit to be written and, in a timing based on the reference frame pulse, outputs the data from the predetermined address.

* * * * *